United States Patent
Albouyeh et al.

(10) Patent No.: US 11,071,918 B2
(45) Date of Patent: Jul. 27, 2021

(54) VIDEO GAME MODIFICATION BASED ON USER STATE

(75) Inventors: Shadi E. Albouyeh, Raleigh, NC (US); Bernadette A. Carter, Raleigh, NC (US); Jon M. Harris, Raleigh, NC (US); Tintin S. Soemargono, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 13/418,847

(22) Filed: Mar. 13, 2012

(65) Prior Publication Data

US 2013/0244791 A1 Sep. 19, 2013

(51) Int. Cl.
*A63F 13/79* (2014.01)
*A63F 13/60* (2014.01)

(52) U.S. Cl.
CPC ............ *A63F 13/79* (2014.09); *A63F 13/60* (2014.09); *A63F 2300/5546* (2013.01); *A63F 2300/69* (2013.01)

(58) Field of Classification Search
CPC .. A63F 13/79; A63F 13/60; A63F 2300/5546; A63F 2300/69
USPC .......................................................... 463/43
See application file for complete search history.

(56) References Cited

U.S. PATENT DOCUMENTS

| | | | | |
|---|---|---|---|---|
| 5,001,632 A | * | 3/1991 | Hall-Tipping | A61B 5/02455 463/23 |
| 5,035,625 A | * | 7/1991 | Munson | G09B 7/04 434/327 |
| 5,377,100 A | * | 12/1994 | Pope et al. | 600/545 |
| 7,261,690 B2 | | 8/2007 | Teller et al. | |
| 7,914,468 B2 | | 3/2011 | Shalon et al. | |
| 2002/0094863 A1 | | 7/2002 | Klayh | |
| 2004/0023761 A1 | | 2/2004 | Emery | |
| 2007/0066403 A1 | * | 3/2007 | Conkwright | A63F 13/10 463/43 |
| 2007/0111858 A1 | | 5/2007 | Dugan | |
| 2007/0167689 A1 | | 7/2007 | Ramadas et al. | |
| 2008/0266250 A1 | * | 10/2008 | Jacob | A63F 13/10 345/156 |
| 2009/0221338 A1 | | 9/2009 | Stewart et al. | |
| 2010/0125026 A1 | | 5/2010 | Zavadsky et al. | |
| 2010/0240458 A1 | | 9/2010 | Gaiba et al. | |

(Continued)

OTHER PUBLICATIONS

"Wii Rehab Applications (wiihab)—ATWiki," http://atwiki.assistivetech.net/index.php/Wii_rehab_applications_%28wiihab%29; Downloaded Mar. 15, 2012.

(Continued)

*Primary Examiner* — Tramar Harper
*Assistant Examiner* — Jeffrey K Wong
(74) *Attorney, Agent, or Firm* — Peter J. Edwards

(57) ABSTRACT

Provided are techniques for modifying the action of a computer game based upon information corresponding to a user. Information may include, but is not limited to, the health and social status of a user and current events. Information related to a particular game player is collected and mapped to moves, scenes and scoring algorithms corresponding to a game. If necessary, moves, scenes and scoring algorithms in the game are modified to accommodate the particular player based upon the collected information.

21 Claims, 5 Drawing Sheets

(56) References Cited

U.S. PATENT DOCUMENTS

2011/0023129 A1* 1/2011 Vernal ................. G06F 21/6245
 726/28
2012/0157200 A1* 6/2012 Scavezze ............... H04N 5/225
 463/31
2013/0029765 A1* 1/2013 Parks et al. ..................... 463/42

OTHER PUBLICATIONS

Medina, Jr., "Physical Activity Evangelist: The Newest Tool for Physical Activity: Kinect!!," http://physicalactivityevangelist.blogspot.com/2010/11/newest-tool-for-physical-activity.html; Downloaded Mar. 13, 2012.

Drapeau, "Xbox Kinect Applications to Health and Medicine," govloop, Tech, Jun. 14, 2012, 11 pages, https://www.govloop.com/community/blog/xbox-kinect-applications-to-health-and-medicine/.

* cited by examiner

VIDEO GAME MODIFICATION BASED ON USER STATE

FIELD OF DISCLOSURE

The claimed subject matter relates generally to computer gaming and, more specifically, to techniques for modifying game play based upon health and social information corresponding to a user.

SUMMARY

Provided are techniques for modifying the action of a computer game based upon information corresponding to a user. Information may include, but is not limited to, the health and social status of a user, current events and previous game playing experiences. Two examples of games that provide a physical experience are the Wii Fit, produced by Nintendo Co. Ltd. of Kyoto, Japan and the Kinect, produced by the Microsoft Corporation of Redmond, Wash. Of course there are many other games and game makers that produce products that could benefit from the disclosed technology.

Provided are techniques for collecting a set information relating to a player of a computing game; mapping the set of information to correlate a datum of the set of information to a particular game element of the computing game; analyzing the datum and the game element to determine a need to modify the game element; and, in response a determination of the need to modify the game element, modifying the game element.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures.

DETAILED DESCRIPTION

Figure 1:
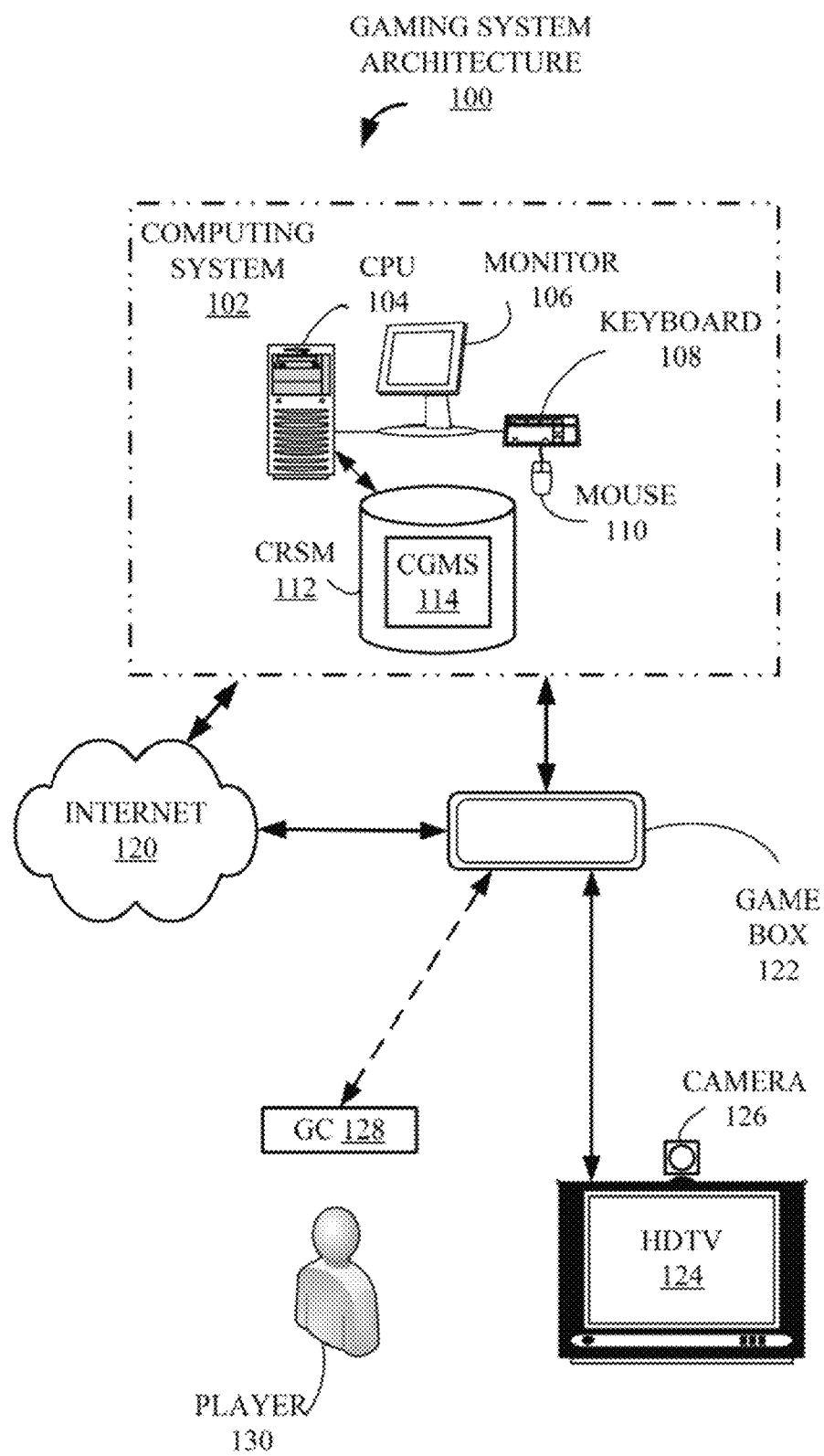
FIG. 1 is a block diagram of a gaming system architecture that may implement the disclosed technology.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Given the rise in popularity of motion-based computer gaming, such as but not limited to Wii by Nintendo and Kinect by Microsoft, players with physical, emotional or mental conditions may experience difficulty or injury due to actions necessary to properly play a particular game. Although motion-based games that aid in rehabilitation either exist or are under development, there is currently no technology available that enables a game to be modified based upon one or more of the following player states: physical state, emotional state or mental state. For example, a player with back problems may have difficulty in conjunction with a bowling game or specific yoga positions.

Turning now to the figures, FIG. 1 is a block diagram of an example of a gaming system architecture 100 that incorporates the claimed subject matter. A computing system 102 includes a central processing unit (CPU) 104, coupled to a monitor 106, a keyboard 108 and a pointing device, or "mouse," 110, which together facilitate human interaction with game system 100 and computing system 102. Also included in computing system 102 and attached to CPU 104 is a computer-readable storage medium (CRSM) 112, which may either be incorporated into client system 102 i.e. an internal device, or attached externally to CPU 104 by means of various, commonly available connection devices such as but not limited to, a universal serial bus (USB) port (not shown). CRSM 112 is illustrated storing a Computer Game Modification System (CGMS) 114 that implements aspects of the claimed subject matter. Although described as stored and executed in conjunction with computing system 102, CGMS 114 may also be implemented in conjunction with a game box 122, as a standalone component coupled to game box 122 or as a service delivered to either computing system 102 or game box 122 from a server (not shown) via the Internet 120. Although in this example, computing system 102 and game box 122 are communicatively coupled to the Internet 120, they could also be coupled through any number of communication mediums such as, but not limited to, a local area network (LAN) (not shown). Regardless of the specific implementation, logic associated with CGMS 114 is typically stored on a CRSM and executed on a processor.

In this example, game box 122 is coupled to a high definition television (HDTV) 124 that may render a video signal originating from game box 122 in conjunction with any games. A camera 126 may provide feedback to game box 122 corresponding to motions of a player 130. A game controller (GC) 128 provides a way for player 130 to interact with game box 122 and thereby control game setup and actions. It should be understood that game system architecture 100 is just one example of a system that may implement the claimed subject matter. One with skill in the relevant arts will appreciate that there are other equally applicable architectures as well. For example, a game may be controlled and rendered entirely on computing system 100 without one or more of game box 122, HDTV 124, camera 126 and GC 128. In addition, some current video gaming systems simply monitor a player's movements with devices such as camera 126, thereby turning the player themselves into the game controller. It should also be noted that a typical gaming system might include less, additional or different components.

Figure 2:
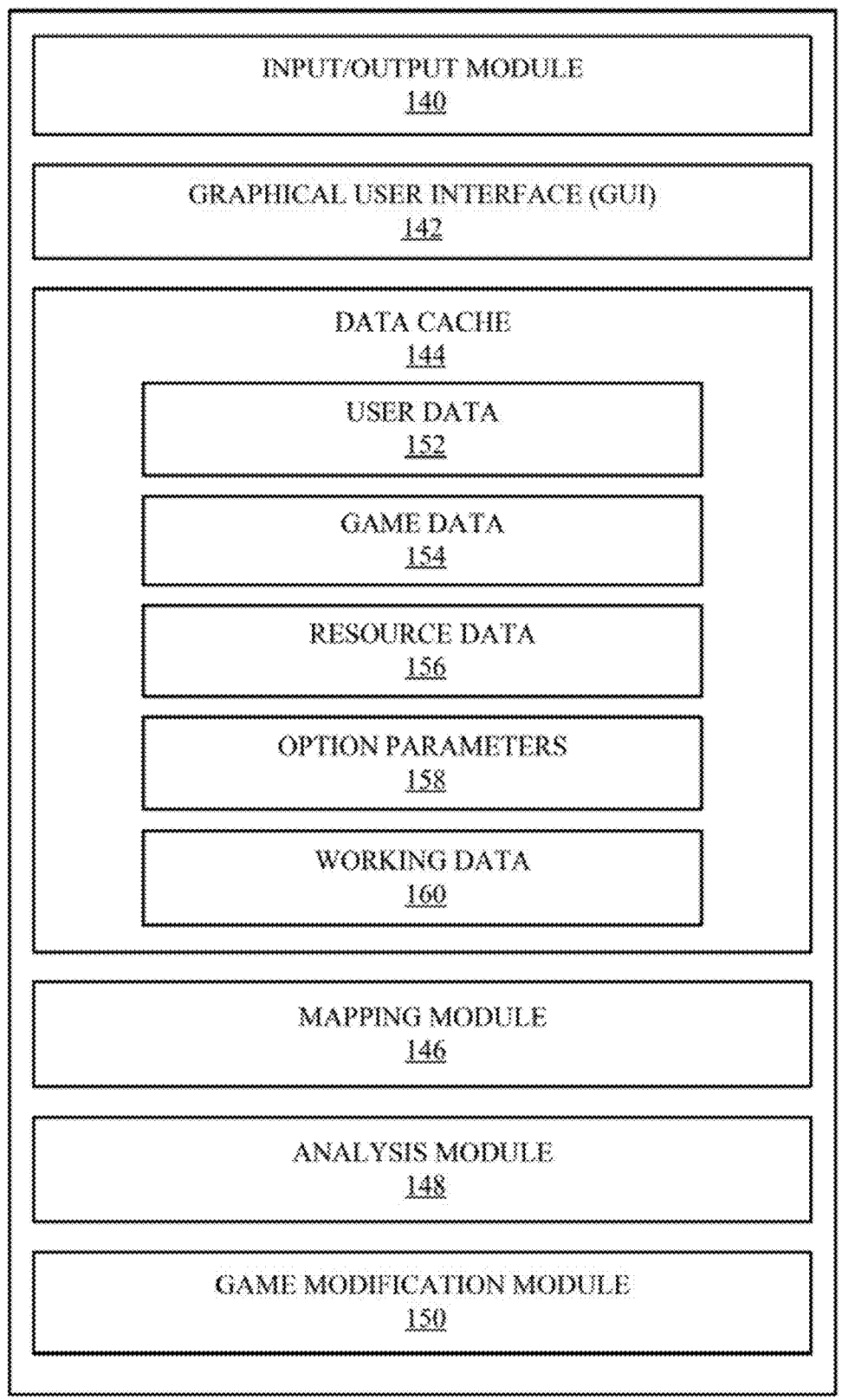
FIG. 2 is a block diagram of a Computer Game Modification System (CGMS), first introduced in FIG. 1, which may implement the claimed subject matter.

FIG. 2 is a block diagram of CGMS 104, first introduced in FIG. 1, in greater detail. For the sake of the following examples, logic associated with CGMS 104 is assumed to execute on computer 102 (FIG. 1) and stored in CRSM 112 (FIG. 1), although as explained above the technology may be incorporated into game box 122 (FIG. 1), incorporated into a standalone component coupled to game box 122 or provided as a service by a server (not shown) via a communication medium such as, but not limited to, the Internet 120. It should also be understood that the claimed subject matter can be implemented in many types of computing systems and data storage structures but, for the sake of simplicity, is described only in terms of computer 102 and system architecture 100 (FIG. 1).

CGMS 104 includes an input/output (I/O) module 140, a graphical user interface (GUI) 142, a data cache component 144, a mapping module 146, an analysis module 148 and a game modification module 150. It should be noted that the representation of CGMS 104 in FIG. 2 is a logical model. In other words, components 140, 142, 144, 146, 148 and 150 may be stored in the same or separates files and loaded and/or executed within system 100 either as a single system or as separate processes interacting via any available inter process communication (IPC) techniques.

Logic associated with I/O module 140 handles communication between CGMS 104 and other components of computing system 102 and system architecture 100. Logic associated with GUI 142 enables users of CGMS 104 to interact with and to define the desired functionality of CGMS 104. Data cache 144 is a data repository for information that CGMS 104 requires during setup and normal operation. Examples of the types of information stored in data cache 144 include user data 152, game data 154, resource data 156, option parameters 158 and working data 160.

User data 152 stores information about specific users of CGMS 104. Types of information may include, but is not limited to, physical and social information concerning each user. For example, user data 152 may include information that a particular user such as player 130 (FIG. 1) currently has an injured right arm. Such information may either be entered by user 130 or a system administrator via GUI 142 or discovered from analysis of health and social data repositories to which user 130 has provided access via such means as the Internet 120 (FIG. 1). For example a health repository may include information provided by user 130 or personal medical records to which user 130 has provided access. A Social data repository may be, but is not limited to, a social networking website on which user 130 has provided access and posted a story about injuring the arm in a basketball game on the previous day. Another example may be user data relating to a particular event that might make user 130 uncomfortable. A description on a social networking website of an uncomfortable situation that was experienced by user 130 or a close associate may, for example, be employed by CGMS 104 to trigger modifications of relevant scenes in a particular game. In addition, user data may include information corresponding to historical data related to game playing sessions of the current game or other games.

Game data 154 stores information about different games that may be configured in accordance with the claimed subject matter. An example of such information includes, but is not limited to, a listing of physical moves required and a correspondence to the various body parts that may either be required or impacted by each particular move. Another example is a listing of social content of particular scenes in each game, e.g. scene 1 includes a first type of situation that is known to make user 130 uncomfortable; scene 2 includes a second type of situation known to make user 130 uncomfortable; and so on. In addition, game data 154 stores information about alternative physical moves and social situations relating to a particular move. For example, a move that impacts a player's wrist may be modified to a move that impacts a player's arm with minimal impact on the wrist.

Resource data 156 stores information about sources of information that may be employed to implement the claimed subject matter. Examples include, but are not limited to, health records provided by user 130, social networking sites and news outlets. Option parameters 158 stores information concerning user and administrator parameters for controlling the operation of CGMS 104. Examples include, but are not limited to, the colors displayed in conjunction with GUI 142 to the time, amount and degree of weight to apply in game modification with respect to a particular situation or injury. One user may require a week to recover from a sprained wrist; another user may only require three days. A news report of an event that may make user 130 uncomfortable gleaned from a news source may be configured to trigger game modification for one week or one month. Working data 160 stores information that CGMS 104, uses during normal operations, including, but not limited to, the results of ongoing calculations.

Logic associated with mapping module 146 controls the mapping of information in user data 152 to game data 154. For example, information in user data 152 indicating that player 130 has suffered a sprained wrist is mapped information in game data 154 indicating that one particular move in a game selected for play by user 130 requires use of or has an impact on the wrist.

Logic associated with analysis module 148 collects information from sources listed in resource data 156 and determines whether or not the collected information is relevant to player 130 and a game selected for play. Analysis module may also employ user data 152 that indicates a particular user's previous responses to moves or scenes. For example, although a particular move may not cause a player injury, the speed or power with which a player typically performs the move may not be in accordance with that which is desirable for the player. Therefore, the move may be replaced by a different move given the player's history with respect to similar moves. If a determination is made that collected information is relevant, logic associated with game modification module 150 modifies a relevant game by, for example, substituting one move or scene for another move or scene, respectively. Game scoring may also be modified. For example, if a player chooses to perform an ill-advised move, the player's score can be negatively impacted or the player may be prevented from moving to another level of game play. Components and data stores 142, 144, 146, 148, 150, 152, 154, 156, 158 and 160 are described in more detail below in conjunction with FIGS. 3-5.

Figure 3:
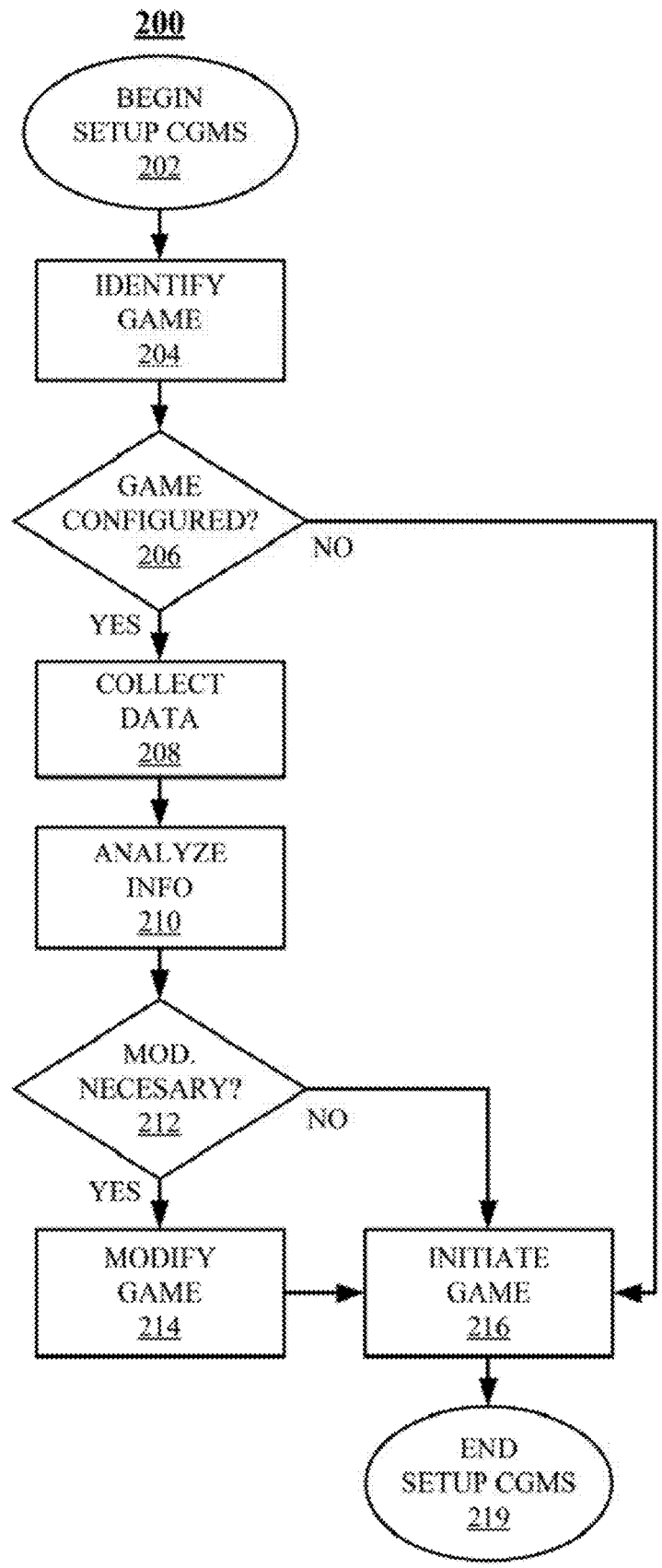
FIG. 3 is an example of a flowchart of a Setup CGMS process that implements aspects of the claimed subject matter.

FIG. 3 is an example of a flowchart of a Setup CGMS process 200 that implements aspects of the claimed subject matter. In this example, logic associated with process 200 is stored on CRSM 112 (FIG. 1) in conjunction with CGMS 114 (FIGS. 1 and 2) and executed on one or more processors (not shown) of CPU 104 (FIG. 1) of computing system 102 (FIG. 1).

Process 200 starts in a "Begin Setup CGMS" block 202 and proceeds immediately to an "Identify Game" block 204. During processing associated with block 204, a particular game that has been initiated is identified, i.e. correlated with stored information on different games (see 154, FIG. 2) In other words, player 130 initiates a game, in this example by turning on game box 122 (FIG. 1) and selecting a game and then the game is correlated with stored game data. During processing associated with a "Game Configured?" block 206, a determination is made as to whether or not the particular game identified during processing associated with block 204 is configured to take advantage of the disclosed technology. If so, control proceeds to a "Collect Data" block 208. During processing associated with block 208, relevant information associated with the current player 130, current game and identified resources is collected from user data 152 (FIG. 2), game data 154 (FIG. 2) and sources identified in resource data 156 (FIG. 2), respectively (see 146 FIG. 2).

Figure 4:
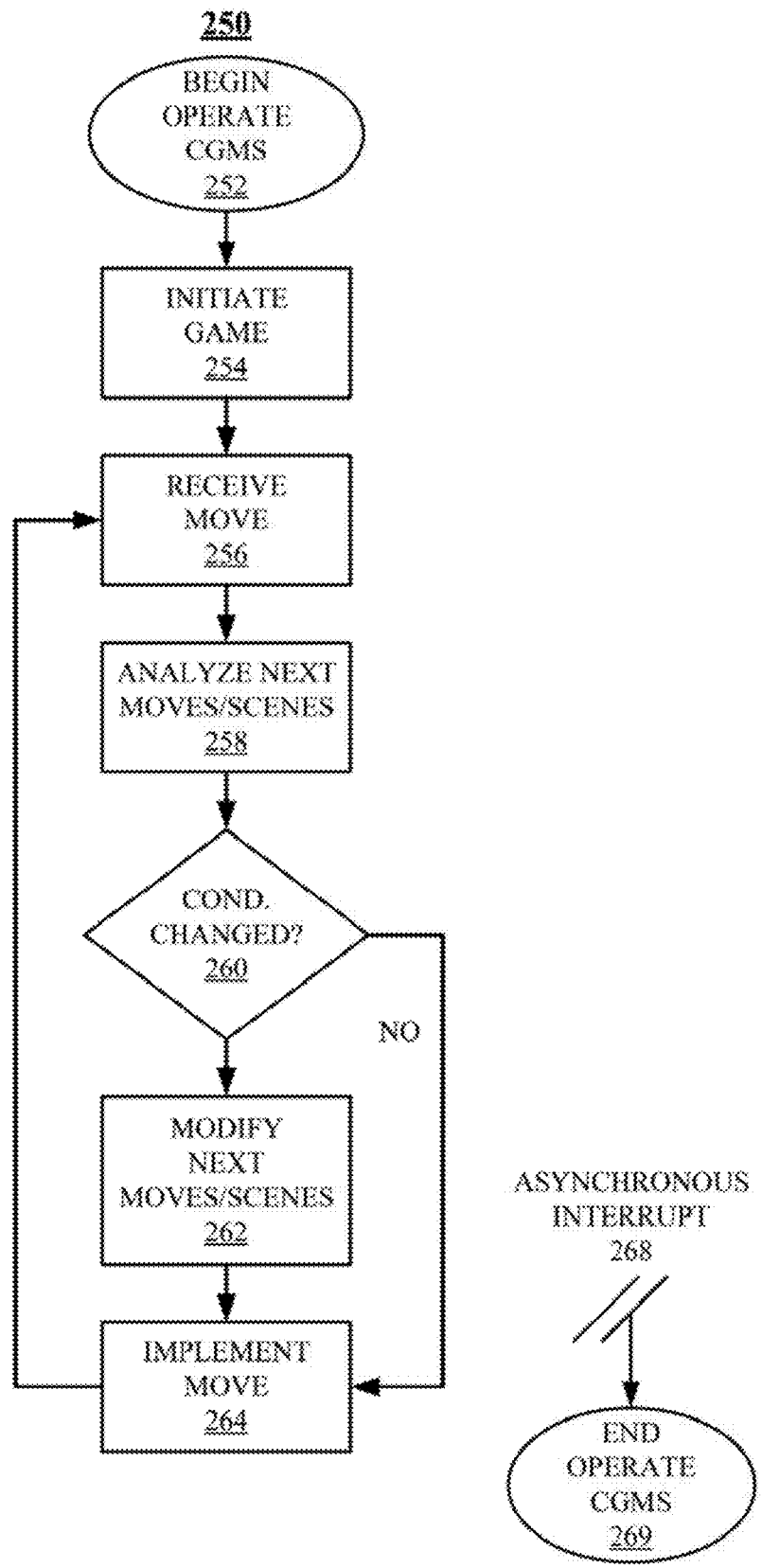
FIG. 4 is an example of a flowchart of an Operate CGMS process that implements dynamic aspects of the claimed subject matter.
Figure 5:
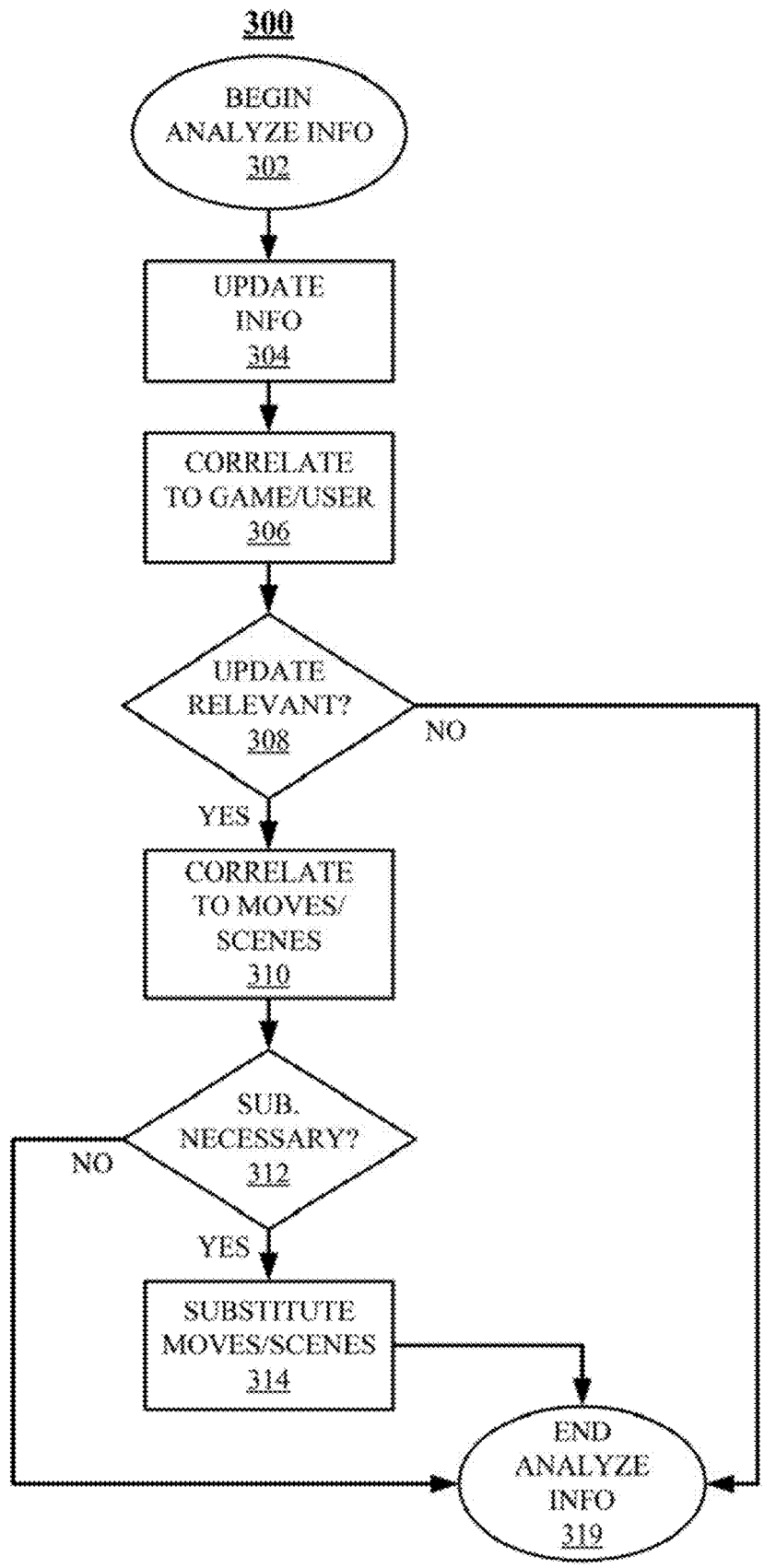
FIG. 5 is an example of an Analyze Information ("Info") process that may implement aspects of the claimed subject matter.

During processing associated with an "Analyze Info" block 210, the data gathered during processing associated with block 208 is analyzed for its potential impact on the current game (see 148, FIG. 2; 300, FIG. 5). Based upon this analysis, during processing associated with a "Modification (Mod.) Necessary?" block 212, a determination is made as to whether or not the current game should be modified. If so, control proceeds to a "Modify Game" block 214. During processing associated with block 214, appropriate changes are made to the current game, including but not limited to, the elimination of specific moves or scenes, substitution of moves or scenes with alternative and modification of scoring algorithms. During processing associated with an "Initiate Game" block 216, the current game is initiated with the modifications implemented during processing associated with block 214 and player 130 may then begin game play (see 250, FIG. 4).

If, during processing associated with block 212 a determination is made that no modification to the current game are necessary, or, during processing associated with block 206, a determination is made that the current game is not configured to implement the claimed subject matter, control proceeds to Initiate Game block 216 and the game is initiated without modification. Finally, once a determination has been made during processing associated with block 206 that the current game is not properly configured, or, once the game has been initiated during processing associated with block 216, control proceeds to an "End Setup CGMS" block 219, process 200 is complete.

FIG. 4 is an example of a flowchart of an Operate CGMS process 250 that implements dynamic aspects of the claimed subject matter. Like process 200 (FIG. 3), in this example, logic associated with process 250 is stored on CRSM 112 (FIG. 1) in conjunction with CGMS 114 (FIGS. 1 and 2) and executed on one or more processors (not shown) of CPU 104 (FIG. 1) of computing system 102 (FIG. 1).

Process 250 starts in a "Begin Operate CGMS" block 252 and proceeds immediately to an "Initiate Game" block 254. During processing associated with block 254, a game, the "current" game, is initiated (see 216, FIG. 3). At this point, game initiating may include some configuration by player 130 (FIG. 1). During processing associated with a "Receive Move" block 256, player 130 makes a move within the current game. During processing associated with block an "Analyze Next Move/Scenes" block 258, an analysis of the next scheduled move and scene in response to the payer's move received during processing associated with block 256 are performed.

During processing associated with a "Conditions (Cond.) Changed?" block 260, a determination is made as to whether or not any change has occurred in the player's situation that would warrant further game modification. For example, during game play it might be ascertained that a particular move is not within the current capability of player 130. If so, during processing associated with a "Modify Next Move/Scenes" block 262 further analysis is made with respect to the player and game (see 148, FIG. 2; 300, FIG. 5) and any additional modifications may be implemented (see 214, FIG. 3) to moves, scenes and/or soring algorithms. During processing associated with an "Implement Move" block 264, the next move/scene in the modified game is implemented, control returns to Received Move block 256 and processing continues as described above.

Finally, process 250 is halted by means of an asynchronous interrupt 268, which passes control to an "End Operate CGMS" block 269 in which process 250 is complete. Interrupt 268 is typically generated when the player 130 ends the game or game box 122 or computing system 102 is turned off. During normal operation, process 250 continuously loops through the blocks 256, 258, 260, 262 and 264, processing moves as a player 130 generates them. In this manner, the disclosed technology can dynamically respond to changing conditions with respect to player 130.

FIG. 5 is an example of an Analyze Information ("Info") process 300 that may implement aspects of the claimed subject matter. Like processes 200 (FIG. 3) and 250 (FIG. 4), in this example, logic associated with process 250 is stored on CRSM 112 (FIG. 1) in conjunction with CGMS 114 (FIGS. 1 and 2) and executed on one or more processors (not shown) of CPU 104 (FIG. 1) of computing system 102 (FIG. 1).

Process 300 starts in a "Begin Analyze Info" block 302 and proceeds immediately to an "Update Info" block 304. During processing associated with block 304, nay changes to user data 152 (FIG. 2), game data 154 (FIG. 2) and sources identified in resource data 156 (FIG. 2) are noted. During processing associated with a "Correlate to Game/User" block 306, changes detected during processing associated with block 304 are mapped to the particular game and player. During processing associated with an "Update Relevant?" block 308, a determination is made as to whether or not the detected changes are relevant, i.e. are significant enough to implement changes to moves, scenes and/or scoring algorithms. If so, control proceeds to a "Correlate to Moves" block 310. During processing associated with block 310, the changes identified are mapped to particular moves, scenes and scoring algorithms (see 146, FIG. 2).

During processing associated with a "Substitution (Sub.) Necessary?" block 312, a determination is made as to whether or not individual moves, scenes and/or scoring algorithms need to be modified. If so, control proceeds to a "Substitute Moves/Scenes" block 314 during which the appropriate modifications are implemented.

Finally, once a determination has been made during processing associated with block 308 that updates are not relevant, during processing associated with block 312 that substitutions are not necessary, or, during processing associated with block 314, appropriate substitutions have been made, control proceeds to an "End Analyze Info" block 319 during which process 300 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
    collecting, by a camera configured to monitor motions of a player of a computing game, a set of information relating to the player prior to the playing of the computing game by the player;
    mapping the set of information to correlate a datum of the set of information to a particular game element of the computing game, wherein the datum comprises the speed with which a player performed a move in a prior playing session of the computing game and is an indication of a decreased ability of the player to play the computing game;
analyzing the datum and the game element to determine a need to modify the game element;
in response to a determination of the need to modify the game element, modifying the game element to decrease a skill level associated with the computing game; and
implementing the modified game element in conjunction with a playing session of the computing game.

2. The method of claim 1, wherein the game element is a player move of the computing game.

3. The method of claim 1, wherein the game element is a rendered scene of the computing game.

4. The method of claim 1, wherein the game element is a scoring algorithm corresponding to the computing game.

5. The method of claim 1, the collecting of information also comprising gathering information from a plurality of sources comprising:
medical information;
social networks;
news outlets; and
online data repositories.

6. The method of claim 1, the collecting of information comprising an analyzing a game playing history corresponding to a previous session of the computing game.

7. The method of claim 1, the collecting of information comprising an analysis of a game playing history corresponding to a second computing game different than the computing game.

8. An apparatus, comprising:
a processor;
a non-transitory computer readable storage medium coupled to the processor; and
logic, stored on the computer readable storage medium and executed on the processor, for:
collecting, by a camera configured to monitor motions of a player of a computing game, a set of information relating to the player prior to the playing of the computing game by the player;
mapping the set of information to correlate a datum of the set of information to a particular game element of the computing game, wherein the datum comprises the speed with which a player performed a move in a prior playing session of the computing game and is an indication of a decreased ability of the player to play the computing game;
analyzing the datum and the game element to determine a need to modify the game element;
in response to a determination of the need to modify the game element, modifying the game element to decrease a skill level associated with the computing game; and
implementing the modified game element in conjunction with a playing session of the computing game.

9. The apparatus of claim 8, wherein the game element comprises a player move of the computing game.

10. The apparatus of claim 8, wherein the game element comprises a rendered scene of the computing game.

11. The apparatus of claim 8, wherein the game element comprises a scoring algorithm corresponding to the computing game.

12. The apparatus of claim 8, the logic for collecting of information also comprising logic for gathering information from a plurality of sources comprising:
medical information;
social networks;
news outlets; and
online data repositories.

13. The apparatus of claim 8, the logic for collecting of information comprising logic for analyzing a game playing history corresponding to a previous session of the computing game.

14. The apparatus of claim 8, the logic for collecting of information comprising logic for analyzing a game playing history corresponding to a second computing game different than the computing game.

15. A computer programming product, comprising:
a non-transitory computer readable storage medium; and
logic, stored on the computer readable storage medium for execution on a processor, for:
collecting, by a camera configured to monitor motions of a player of a computing game, a set of information relating to the player of a computing game prior to the playing of the computing game by the player;
mapping the set of information to correlate a datum of the set of information to a particular game element of the computing game, wherein the datum comprises the speed with which a player performed a move in a prior playing session of the computing game and is an indication of a decreased ability of the player to play the computing game;
analyzing the datum and the game element to determine a need to modify the game element;
in response to a determination of the need to modify the game element, modifying the game element to decrease a skill level associated with the computing game; and
implementing the modified game element in conjunction with a playing session of the computing game.

16. The computer programming product of claim 15, wherein the game element comprises a player move of the computing game.

17. The computer programming product of claim 15, wherein the game element comprises a rendered scene of the computing game.

18. The computer programming product of claim 15, wherein the game element comprising a scoring algorithm corresponding to the computing game.

19. The computer programming product of claim 15, the logic for collecting of information also comprising logic for gathering information from a plurality of sources comprising:
medical information;
social networks;
news outlets; and
online data repositories.

20. The computer programming product of claim 15, the logic for collecting of information comprising logic for analyzing a game playing history corresponding to a previous session of the computing game.

21. A method, comprising:
collecting, by a camera configured to monitor motions of a player of a computing game, a set of information relating to the player, wherein the information is collected prior to the playing of the computing game by the player;
mapping the set of information to correlate a datum of the set of information to a scoring algorithm of the computing game, wherein the datum comprises the speed with which a player performed a move in a prior playing session of the computing game;
analyzing the datum and the game element to determine a need to modify the scoring algorithm;

in response to a determination of the need to modify the game element, modifying the scoring algorithm; and
implementing the modified scoring algorithm in conjunction with a paying session of the computing game.

\* \* \* \* \*